United States Patent [19]

Farber

[11] 4,222,807
[45] Sep. 16, 1980

[54] RIDGED SURFACE SOLAR HEATER

[76] Inventor: Joseph Farber, 1605 Sherington Pl., Newport Beach, Calif. 92663

[21] Appl. No.: 951,331

[22] Filed: Oct. 16, 1978

Related U.S. Application Data

[62] Division of Ser. No. 693,702, Jun. 7, 1976, Pat. No. 4,120,286.

[51] Int. Cl.$^2$ .............................................. F24J 3/02
[52] U.S. Cl. ......................... 156/244.13; 156/244.18; 156/256
[58] Field of Search ............... 126/445, 448; 165/170; 156/244.13, 244.18, 256

[56] References Cited

U.S. PATENT DOCUMENTS 4,098,331  7/1978  Ford et al. ......................... 126/448

Primary Examiner—Carroll B. Dority, Jr.
Attorney, Agent, or Firm—William L. Chapin

[57] ABSTRACT

A solar heater for water or similar fluids comprises extruded semi-rigid plastic panels containing a plurality of adjacent tubular channels adapted to conducting fluid longitudinally through the interior of the panel from a transverse inlet manifold to a transverse outlet manifold. Flow-restricting passages between the manifolds and channels tend to equalize the flow rates through each channel. Integral with the upper surface of the panels is a plurality of parallel, longitudinally-disposed, triangular cross-section ridges adapted to absorbing solar energy. Solar energy unavoidably reflected from the plane surfaces of the ridges is partially absorbed by adjacent ridge surfaces, increasing the energy absorption efficiency of the panels.

1 Claim, 6 Drawing Figures

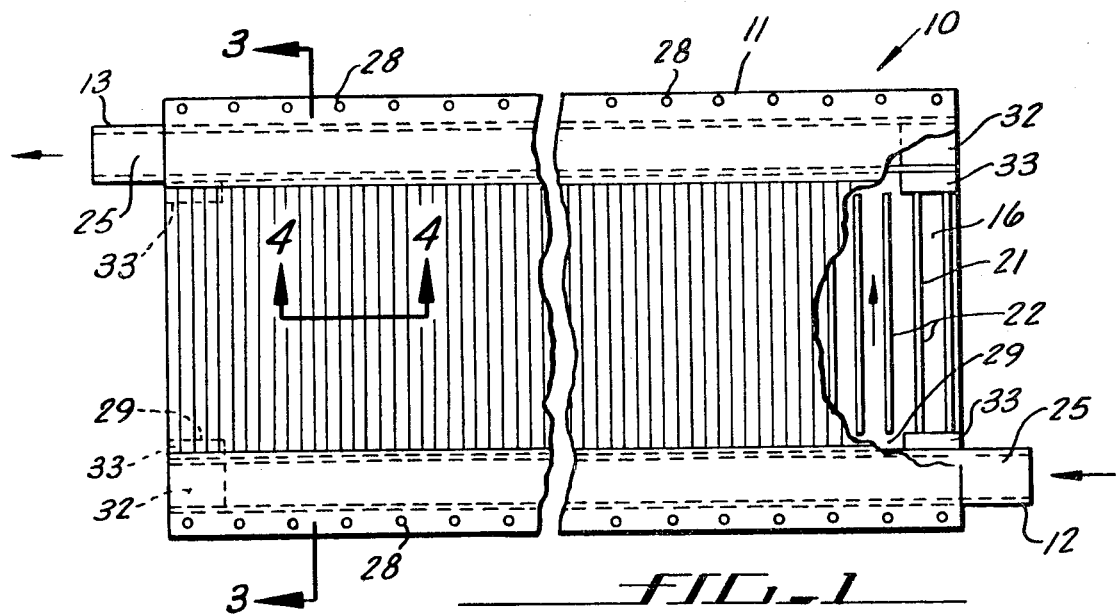
FIG_1
FIG_2
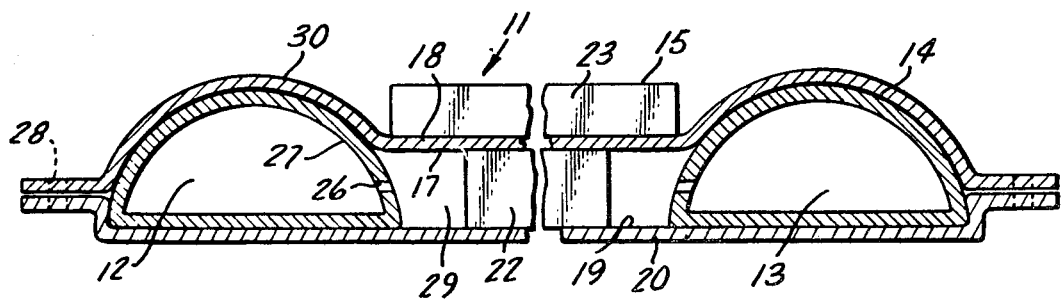
FIG_3
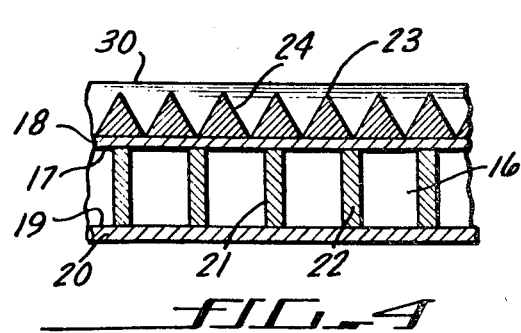
FIG_4

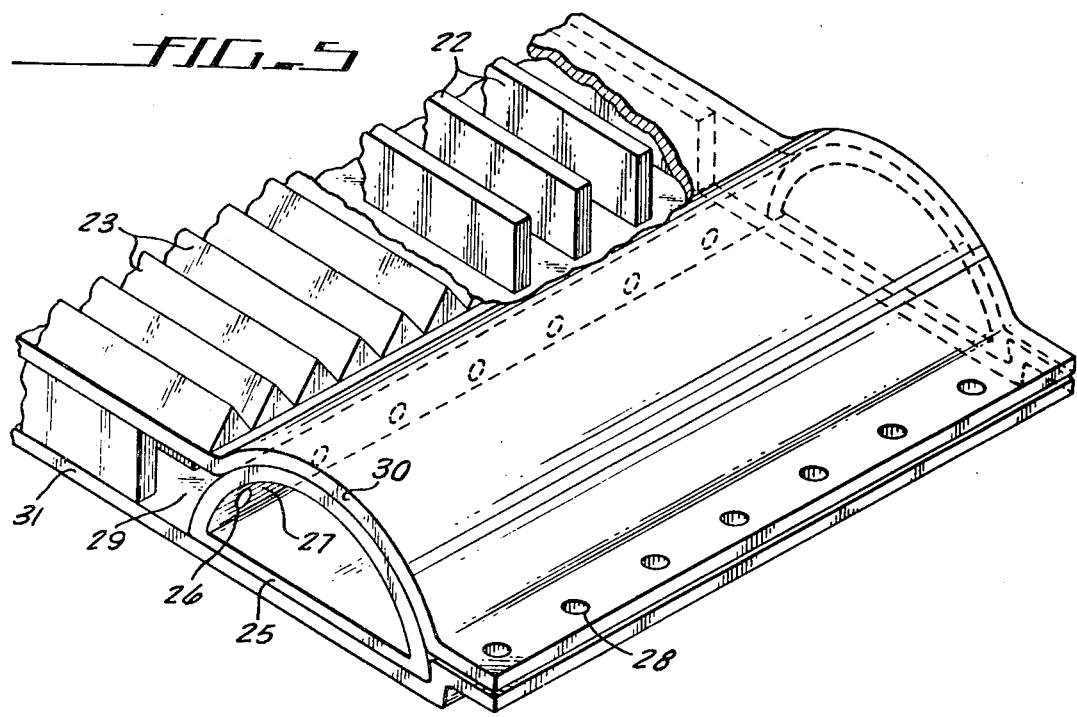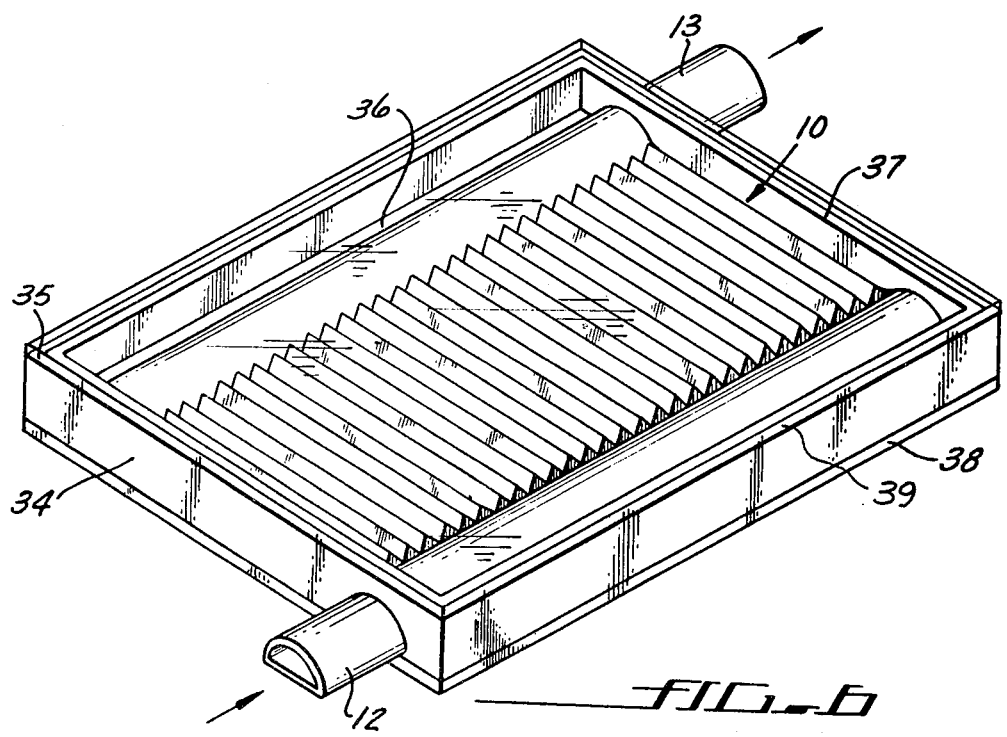

RIDGED SURFACE SOLAR HEATER

This application is a division of application Ser. No. 693702 filed June 7, 1976 and now U.S. Pat. No. 4,120,286.

FIELD OF THE INVENTION

This invention relates to devices for transferring heat energy to fluids and more particularly to devices utilizing the absorption of solar radiation to heat water or similar fluids.

BACKGROUND OF THE INVENTION

With concern over the ultimate exhaustion of energy sources such as fossil fuels a prime motivating factor, considerable attention has been given to the possible utilization of solar energy as a substitute energy source. As a result of that attention, a substantial amount of inventive effort has been expended in attempts to develop more efficient solar heaters for such diverse applications as home and commercial heating, industrial and agriculture processing and swimming-pool heating.

Older prior art solar water heaters disclosed costly, heavy and cumbersome combinations of metal pipes, heat absorbers, reflectors and glass heat-trapping windows.

More recently disclosed solar water heater concepts have employed modern plastic materials to minimize the cost and weight of the heaters. One disadvantage of some such plastic solar heaters is their inability to withstand even the moderate internal fluid pressures required to support reasonably high fluid flow rates through the heater.

High fluid flow rates are desirable because their use results in a rapid conduction of heat away from the solar energy absorbing surface of the heater, resulting in a relatively low surface temperature. The low surface temperature minimizes energy losses from the surface. This is because radiation losses are proportional to the fourth power of the surface temperature, while convection losses are nearly proportional to the first power of the temperature, and conduction losses are proportional to the first power of the surface temperature.

The present invention utilizes a novel extruded plastic semi-rigid configuration capable of sustaining the relatively high internal fluid pressures necessary for maintaining substantially high fluid flow rates.

Another novel and useful feature of the present invention is a ridged heat-absorbing surface which affords efficient solar energy absorption over a wide range of sun azimuth angles.

The present invention also employs a novel inlet manifold and outlet manifold configuration which assures substantially uniform sharing of the fluid mass flow rates by each flow conducting channel through the heater panels, thus assuring a uniformly low heater surface temperature to minimize radiation and convection losses. A novel reservoir section between the inlet manifold and channel entrances helps to maintain a relatively constant fluid flow rate through the panels despite variations in the pressure of the fluid supplied to the inlet manifold.

OBJECTS OF THE INVENTION

An object of the invention disclosed herein is to provide means for absorbing solar radiation and utilizing the absorbed energy to heat water or similar fluids.

Another object of the invention is to provide means for heating a flowing fluid by absorption of solar radiation.

Another object of the invention is to provide means for efficiently absorbing solar radiation over a wide range of sun azimuth angles.

Another object of the invention is to provide a solar fluid heater fabricated from low-cost plastic materials.

Another object of the invention is to provide a solar fluid heater fabricated from low cost plastic materials, yet capable of sustaining relatively high internal fluid pressures.

Another object of the invention is to provide means for causing substantially uniform fluid mass flow rates through a plurality of channels in a solar fluid heater.

Another object of the invention is to provide means for causing substantially uniform fluid mass flow rates through a solar heater despite variations in the pressure of the fluid supplied to the heater and non-uniform channel flow resistance.

Another object of the invention is to provide a solar fluid heater comprised of low-cost modular plastic absorbing panels capable of sustaining relatively high internal fluid pressures and which panels are readily joinable to a common inlet manifold and common outlet manifold to form solar heaters of desired capacity.

Another object of the invention is to provide solar heating panels having a low profile and a substantially flat underside to afford convenient mountability to flat surfaces.

Another object of the invention is to provide solar heating panels with flexible extruded upper and lower surfaces readily joinable to transverse inlet and outlet manifolds and extendable beyond the manifolds to form mounting flanges.

Various other objects and advantages of the present invention will appear from the following descriptions of one embodiment of the invention, and the most novel features will be particularly pointed out hereinafter in connection with the appended claims.

It is to be understood that although the invention disclosed herein is fully capable of achieving the objects and providing the advantages hereinbefore mentioned, the structural and operational characteristics of the invention described herein are merely illustrative of the preferred embodiments. Accordingly, I do not intend the scope of my exclusive rights and privileges in the invention to be limited to the details of construction and operation described, but only to those embodiments and their reasonable equivalents and adaptations delineated in the appended claims.

BRIEF SUMMARY OF THE INVENTION

Briefly stated, this invention comprehends a solar water heater constructed of semi-rigid extruded plastic panels containing parallel adjacent channels adapted to conduct fluid through the interior of the panels. The panels are joined to manifolds disposed transversely on each end of the panels, which manifolds are adapted to conduct fluid flow to and from the panels in a direction transverse to the longitudinal flow through the panels.

Fluid flow from the channels into the outlet manifold is restricted by holes having a smaller total cross-sectional area than the corresponding total cross-sectional areas of the channels with which they communicate.

A reservoir located between the outlets of the inlet manifold and the channel entrances is adapted to provide a fluid supply capacity under sufficiently uniform pressure to service the channel flow rate requirements. Holes drilled through the outlet side of the inlet manifold conduct fluid from the manifold to the reservoir. The cross-sectional area of the holes is chosen to restrict the flow rate from the inlet manifold, performing a throttling effect on the flow between the reservoir and manifold. Thus the reservoir pressure is maintained relatively constant in spite of possible variations in the pressure of the fluid supplied to the manifold input.

The lower surface of the extruded panels is flat to provide easy mountability on flat support surfaces. The upper surface of panels has a serrated cross-section resulting in the formation of a plurality of adjacent triangular cross-section ridges longitudinally disposed on the panel surface. Thus the ridges are disposed in a direction parallel to the extrusion and fluid-flow directions.

Since the plastic of which the ridged panels are formed is formulated to provide good absorption of solar rays, illuminating the panels with the sun's rays causes substantial heating of the fluid flowing within the channels. However, even using optimum absorbing materials results in a finite amount of solar energy being reflected from the absorbing surfaces. In the present invention, the use of a ridged surface permits an adjacent surface to absorb reflected rays, such higher-order absorption processes constituting a trapping process that improved the overall efficiency of absorption. Another advantage offered by the inclined absorbing surfaces is the resulting smaller deviation from perpendicular incidence of the sun's rays on the surface for substantially large sun azimuth angles. For normal materials which deviate from the cosine absorption law, smaller angles of incidence with respect to the surface normal result in more efficient absorption.

BRIEF DESCRIPTION OF THE DRAWINGS

FIG. 1 is a plan view of the invention showing one or more extruded panels joined to inlet and outlet fluid-conducting manifolds to comprise a solar heater.

FIG. 2 is a side elevation view of the solar heater.

FIG. 3 is a transverse sectional view of the solar heater taken along line 3—3 in FIG. 1.

FIG. 4 is a fragmentery longitudinal sectional view of the solar heater taken along line 4—4 in FIG. 1.

FIG. 5 is a perspective end view of the solar heater.

FIG. 6 is a perspective view of another embodiment of the solar heater in which the assembly shown in FIG. 1 is enclosed in a container which permits solar radiation to act upon the enclosed solar heater panels, yet inhibits convective and radiative heat losses from the heater.

DESCRIPTION OF THE PREFERRED EMBODIMENTS

Referring now primarily to FIG. 1 and also to FIGS. 2 through 5, a solar heater 10 is shown which comprises at least one extruded plastic fluid-conducting and heat-absorbing panel 11, an inlet fluid conducting manifold 12, and an outlet fluid conducting manifold 13. As may best be seen from FIG. 2, the panels 11 and attached manifolds 12 and 13 comprise an assembly having a substantially flat bottom surface well adapted to mounting on a flat surface such as a roof. Alternatively, an insulating panel may be sandwiched between the two surfaces. The upper surface of the manifold 14 extends slightly above the uppermost heat absorbing surface 15 of the panels.

As may best be seen from FIG. 4, the interior of the panels 11 comprises a plurality of adjacent channels 16 extending longitudinally through the entire length of the panels. The channels are formed, respectively, by the lower surface 17 of the upper panel wall 18, the upper surface 19 of the lower panel wall 20 and the inner surfaces 21 of adjacent vertical separator walls 22. As shown in FIGS. 1 and 4, the cross sections of the channels are uniform from channel to channel, and throughout the length of the panels. Although square cross-section channels are depicted in FIG. 4, circular, triangular or other cross-sectional shapes could be used without departing from the spirit of the invention.

The preferred manner of fabricating the panels 11 is by a hot extrusion process using a semi-rigid plastic such as ABS or polypropylene. To contain the desired fluid pressures at the required operating temperatures of the solar panels, I have found that a suitable wall thickness using the above materials is 20 thousandths of an inch or more, for channels one-quarter inch wide and three-sixteenths inch high.

As may be seen from FIGS. 3 and 4, the upper surfaces 15 of the solar panels 11 have serrated extrusion cross-sections, resulting in panels having an upper surface comprised of adjacent, longitudinally disposed, triangular cross-section ridges 23. In use, the panels are mounted with their longitudinal axes, i.e., the axes parallel to the extrusion and fluid-flow directions, in an essentially north-south direction. With this orientation, the inclined longitudinal surfaces 24 of the triangular cross-section ridges 23 will be more nearly perpendicular to the sun's rays for large azimuth angles than would a flat surface. Therefore, since the radiant absorptivity of most materials, including those suitable for use in the present invention, is greater for perpendicular incidence, more energy will be absorbed as the sun traverses from horizon to horizon by the presently disclosed inclined surfaces than by a flat surface.

An additional advantage offered by the inclined absorbing surfaces is the radiation trapping effect they afford. Thus since even absorbing surfaces fabricated from materials designed to maximize absorption reflect a substantial portion of incident solar radiation, placement of adjacent inclined absorbing surfaces permits absorption of reflected rays which would ordinarily be wastefully propagated into the atmosphere.

FIGS. 3 and 5 depict the manner in which the solar heat absorbing panels 11 are joined to inlet manifold 12 and outlet manifold 13. As may best be seen from FIG. 5, the inlet manifold 12 comprises a semi-oval cross-section tube 25 with a substantially flat bottom horizontal surface. The manifold is preferably extruded from a semi-rigid plastic such as ABS or polypropylene. The wall thickness of the manifold is sufficiently thick to withstand the internal fluid pressures and temperatures required of the solar heater. I have found that for a tube having an interior width of about one inch and an interior height of about one-half inch, the wall thickness should be sixty-thousandths of an inch or greater. A plurality of holes 26 is drilled through one sidewall 27 of the manifold tube 25 to permit flow to or from the manifold in a direction transverse to the longitudinal flow through the manifold.

As may best be seen from FIGS. 3 and 5, the extruded plastic panels 11 are joined to the manifolds 12 and 13 as follows. First, a longitudinal cut flush with the inner surface of the upper panel wall and running the full width of the panel is made to the desired longitudinal depth. Subsequently to or simultaneously with that cut, a parallel cut is made flush with the inner surface of the lower panel wall. Finally, a vertical cut is made transversely through the entire width of the panel at the longitudinal distance from the panel edge to which the parallel longitudinal cuts were made. The combination of the three aforementioned cuts results in severing the internal vertical separating walls within the panel to the desired longitudinal depth. The severed vertical walls are removed to leave portions of the flexible upper and lower panel walls available for conformal joining to the upper and lower outer surfaces of the manifold. As is shown in FIGS. 3 and 5, the upper panel wall 18 and lower panel wall 20 may both be extended beyond the outer edge of the oval manifold tube 25 to form a lap joint between the upper and lower walls. The lap joint thus formed constitutes a flange running substantially the full width of the panels, and may be punched through and fitted with grommets 28 adapted to fastening the panel to a supporting surface. To increase the flexibility of the slit upper panel wall, the triangular ridges thereupon may be severed flush with the surface forming their bases, as shown in FIG. 5.

The slit upper wall 18 and lower wall 20 may be positioned longitudinally with respect to the manifold tube 25 so as to place the sidewall 26 of the manifold in direct contact with the vertical channel walls interior to the slit panel, at the junction between the slit and intact portions of the panel. Preferably, however, the slit ends of the panel walls are so positioned longitudinally with respect to the manifold sidewall as to leave a rectangular cross-section prismatic space between the manifold wall and the ends of the vertical walls interior to the panel. That space comprises a fluid storage reservoir 29 which is adapted to pressurization to provide a more nearly constant flow of fluid to the channels under conditions of variable supply pressure of the fluid supplied to the manifold input and variations in flow resistance of individual channels.

The slit ends 30 and 31 of the panel 11 are preferably sealed to the manifold tube 25 by a welding process which may employ thermal, ultrasonic, dielectric or induction heating. To facilitate welding by the latter two processes, special energy-absorbing tapes, screens or coatings may be applied to one or both surfaces to be joined. The function of the energy absorbers is to absorb sufficient energy from the electromagnetic field surrounding the members to be joined to cause melting sufficient to ensure a good welded joint between the surfaces. During the welding process, the surfaces to be joined, including flanged surfaces 30 and 31 are clamped to apply pressure sufficient to ensure good welded joints.

For some manifold and panel materials, adhesives or solvent cements may be used to join the manifolds and panels together.

Plugs 32 fabricated of plastic or other suitable material are used to form pressure-tight seals in those ends of the manifold tubes opposite the inlet and outlet ends, respectively. The plugs are inserted into the open ends of the manifold tubes and fastened thereto by one of the methods previously described.

Plugs 33 fabricated of plastic or other suitable material are used to form pressure-tight seals in each end of the inlet and outlet reservoirs 29. The plugs have a length at least equal to the width of one fluid-conducting channel 16, and are inserted into the open ends of the reservoirs and fastened thereto by one of the methods previously described.

To construct an array of two or more solar heating panels, adjacent panel manifolds are fastened together with plug 32 deleted from adjacent panel manifolds.

FIG. 6 illustrates an alternate embodiment of the invention. In this embodiment, the solar heater panels and manifold assembly 10 is placed in a box-like enclosure 34. The box walls 35 and floor 36 are preferably fabricated of a good thermally insulating material such as structural polycarbonate foam. Prior disclosure boxes have usually been wood or metal. Additional insulating layers such as 37 and 38 may be used to provide more insulation than may be provided by the box material alone.

The box 34 is covered with a window 39 composed of a material substantially transparent to the visible portion of the sun's spectrum in which most of its energy is concentrated. The covering material additionally has poor transmittance to the long-wave infrared radiation produced by the heated solar panels. By this choice of wind material, wasteful convection and reradiation of energy into the atmosphere is minimized, permitting even greater efficiencies than are achievable with unenclosed solar panels.

OPERATION OF THE INVENTION

In operation, the solar heater 10 is mounted with the longitudinal axis of the solar panels 11 laying in a substantially north-south direction. The panel surface is inclined so as to be essentially perpendicular to the sun's rays at high noon. Fluid under pressure, such as from the discharge side of a swimming pool pump and filter, is supplied to the inlet manifold 12. Under the influence of the externally-applied pressure, fluid is forced through the manifold exit holes 26 into the fluid storage reservoir 29. Fluid from the reservoir is forced into the parallel longitudinal flow-conducting channels 16. As fluid flows through the channels, heat absorbed from the sun's rays by the upper surface 15 of the solar panels is conducted through the channel walls to the fluid therewithin, heating the fluid. The heated fluid subsequently passes through flow-equalizing restricting holes 26 into outlet manifold 13. Heated fluid exiting from the outlet manifold may be used as desired such as by being returned to a swimming pool to effect a temperature rise thereof.

By the placement of the solar heater with its triangular ridges oriented in an essentially north-south direction, a portion of those sun's rays which would ordinarily be reflected back into the atmosphere are absorbed by adjacent absorbing surfaces. The opposite inclinations of adjacent ridge surfaces also ensures that solar rays will be impinge on at least half of the absorbing ridge surfaces at more nearly perpendicular incidence for a wider range of sun azimuth angles than would a flat absorbing surface. Thus the present invention more effectively utilizes the sun's rays to produce a greater fluid heating effect than a conventional flat surface solar heater having the same area.

The fluid storage reservoir 29 in conjunction with flow-restricting holes 26 provides a relatively constant supply of fluid to the channels 16 in spite of variations in the pressure of the fluid supplied to the inlet manifold.

Output manifold flow-restricting holes 26 ensure that fluid-flow rates through each channel are substantially equal, maintaining a substantially uniform absorber surface temperature.

The construction of the solar panels 11 of a semi-rigid plastic in conjunction with the stiffening effect of the surface ridges 23 permits use of the relatively large internal fluid pressures which are required for high fluid flow rates.

What is claimed is:

1. The process of fabricating an apparatus adapted to heating fluid by absorption of radiant energy and cooling fluid by radiation and convection comprising:
   (a) longitudinally extruding from a plastic material a uniform cross-section having a substantially flat bottom surface, an upper surface parallel to the bottom surface, and a plurality of parallel tubular channels longitudinally disposed between the bottom and upper surface,
   (b) cutting the extruded section transversely at either end of the longitudinal axis of the section to form a section of desired length,
   (c) severing to the desired longitudinal depth from each end the interior of the extruded section flush with the insides of the parallel upper and lower wall surfaces,
   (d) removing the severed interior section material from both ends of the section,
   (e) conformally bending the flat inner surface upper and lower section walls at one end of the section around a transversely-disposed curvilinear cross-section inlet manifold tube having an inlet and a plurality of output holes disposed along the length of tube on the surface of the tube adjacent to the channels,
   (f) joining the upper and lower section walls to the inlet manifold tube,
   (g) conformally bending the flat inner surface upper and lower section walls at the opposite end of the section around a transversely disposed curvilinear cross-section outlet manifold tube having an outlet and a plurality of input holes disposed along the length of the tube on the surface of the tube adjacent to the channels,
   (h) joining the upper and lower section walls to the outlet manifold tube,
   (i) sealing the space between the section walls and inlet and outlet tubes,
   (j) sealing the end of the inlet tube transversely opposed to the inlet opening,
   (k) sealing the end of the outlet tube transversely opposed to the outlet opening, and (1) extending the slit upper and lower wall sections longitudinally beyond the outside edges of the manifold tubes and fastening the extended wall sections together in lap joints to comprise mounting flanges disposed along the outside edges of the inlet and outlet manifold tubes.

* * * * *